(12) United States Patent
Gruenberger et al.

(10) Patent No.: US 11,682,776 B2
(45) Date of Patent: Jun. 20, 2023

(54) METERING VALVE AND JET PUMP UNIT FOR CONTROLLING A GASEOUS MEDIUM

(71) Applicant: Robert Bosch GmbH, Stuttgart (DE)

(72) Inventors: Andreas Gruenberger, Spraitbach (DE); Armin Richter, Leinfelden-Echterdingen (DE); Hans-Christoph Magel, Reutlingen (DE); Stephan Wursthorn, Esslingen A.N. (DE)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 16/634,274

(22) PCT Filed: Jun. 13, 2018

(86) PCT No.: PCT/EP2018/065571
§ 371 (c)(1),
(2) Date: Jan. 27, 2020

(87) PCT Pub. No.: WO2019/020266
PCT Pub. Date: Jan. 31, 2019

(65) Prior Publication Data
US 2021/0091393 A1    Mar. 25, 2021

(30) Foreign Application Priority Data
Jul. 25, 2017   (DE) .................. 10 2017 212 726.0

(51) Int. Cl.
*F16K 31/06* (2006.01)
*H01M 8/04082* (2016.01)
(Continued)

(52) U.S. Cl.
CPC ......... *H01M 8/04201* (2013.01); *F04B 49/22* (2013.01); *F04F 5/16* (2013.01);
(Continued)

(58) Field of Classification Search
CPC .......... F16K 31/0655; F16K 1/42; F16K 1/34; F04B 49/22; F04B 5/461; H01M 8/04753;
(Continued)

(56) References Cited

U.S. PATENT DOCUMENTS

| 629,562 A * | 7/1899 | Hogue ................. F04F 5/461 417/192 |
| 6,948,697 B2 * | 9/2005 | Herbert .............. F16K 37/00 251/129.17 |

(Continued)

FOREIGN PATENT DOCUMENTS

| CN | 1875214 A | 12/2006 |
| CN | 101069317 A | 11/2007 |

(Continued)

OTHER PUBLICATIONS

International Search Report for Application No. PCT/EP2018/065571 dated Sep. 20, 2018 (English Translation, 2 pages).

*Primary Examiner* — Umashankar Venkatesan
(74) *Attorney, Agent, or Firm* — Michael Best & Friedrich LLP

(57) ABSTRACT

The invention relates to a metering valve (1) for controlling a gaseous medium, in particular hydrogen, comprising a valve housing (2), wherein an interior space (3) is formed in the valve housing (2). A reciprocating closing element (10) is arranged in the interior space (3), which interacts with a valve seat (37) for opening or closing at least one passage channel (25). Furthermore, the metering valve (1) comprises a nozzle (11), the at least one passage channel (25) being formed in the nozzle (11) and the passage channel (25) having a circular-cylindrical portion.

18 Claims, 2 Drawing Sheets

Figure 1:
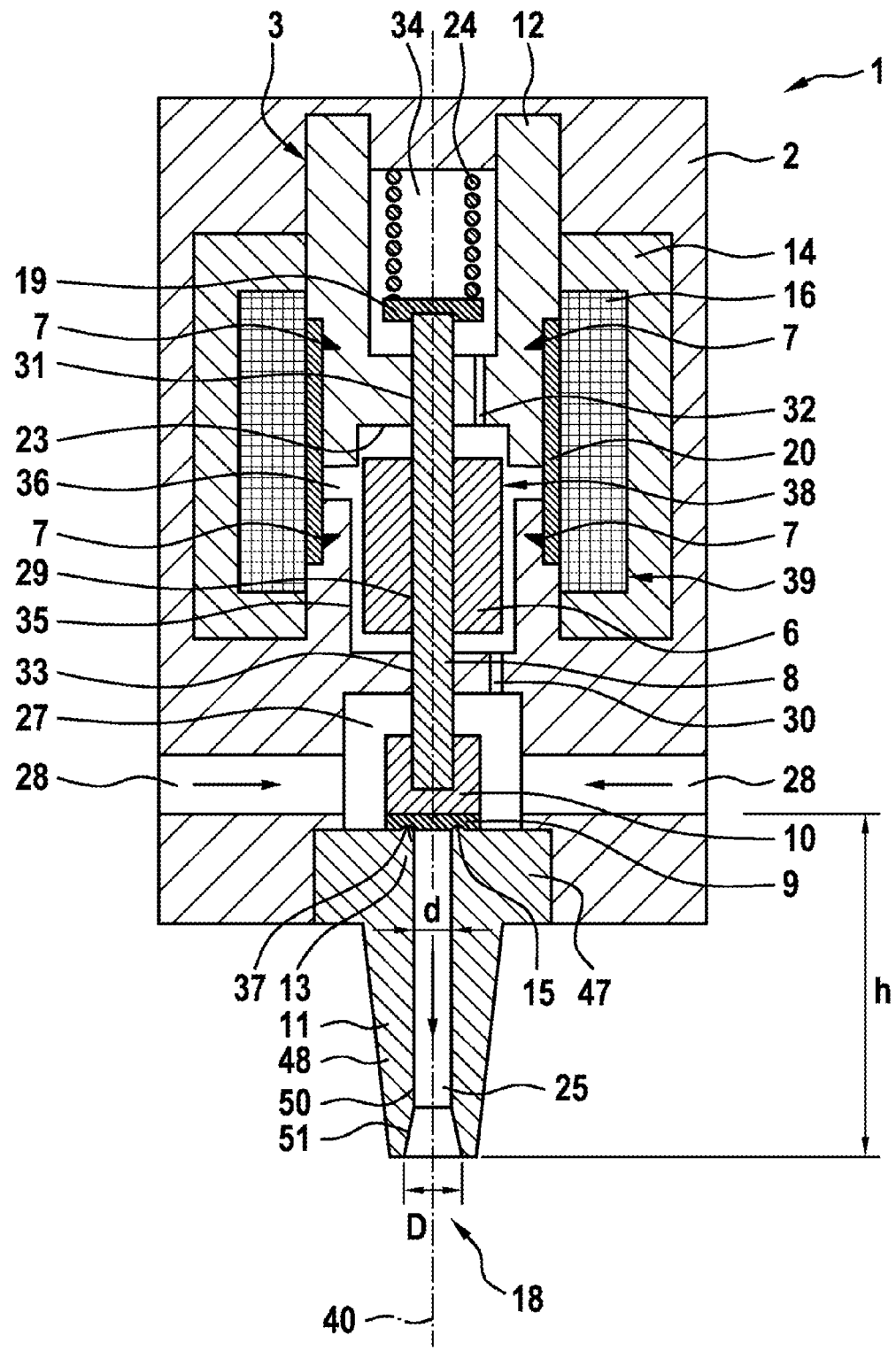

(51) Int. Cl.
    *F04B 49/22*     (2006.01)
    *F04F 5/46*     (2006.01)
    *F16K 1/42*     (2006.01)
    *H01M 8/04746*     (2016.01)
    *F16K 1/34*     (2006.01)
    *F04F 5/16*     (2006.01)
    *H01M 8/04089*     (2016.01)

(52) U.S. Cl.
    CPC ............. *F04F 5/461* (2013.01); *F16K 1/34* (2013.01); *F16K 1/42* (2013.01); *F16K 31/0655* (2013.01); *H01M 8/04097* (2013.01); *H01M 8/04753* (2013.01)

(58) Field of Classification Search
    CPC .......... H01M 8/04097; H01M 8/04201; B05B 1/005; Y02E 60/50
    USPC .......................................................... 137/888
    See application file for complete search history.

(56) References Cited

U.S. PATENT DOCUMENTS

| | | | |
|---|---|---|---|
| 9,029,032 B2 | 5/2015 | Noh et al. | |
| 9,368,806 B2* | 6/2016 | Noh | B05B 1/3013 |
| 10,541,432 B2* | 1/2020 | Koyama | F04F 5/16 |
| 2002/0117644 A1* | 8/2002 | Carrillo | F16K 31/0651 |
| | | | 251/129.08 |
| 2006/0137744 A1 | 6/2006 | Anastas | |
| 2007/0063160 A1* | 3/2007 | Suzuki | F16K 31/0655 |
| | | | 251/129.21 |
| 2007/0235669 A1 | 10/2007 | Suzuki et al. | |
| 2008/0149868 A1* | 6/2008 | Bittner | F16K 31/0655 |
| | | | 251/24 |
| 2009/0155092 A1* | 6/2009 | Fukuma | H01M 8/04097 |
| | | | 429/513 |
| 2009/0155668 A1* | 6/2009 | Ban | H01M 8/04097 |
| | | | 429/411 |
| 2009/0317691 A1* | 12/2009 | Yamada | F04F 5/18 |
| | | | 429/444 |
| 2012/0115056 A1* | 5/2012 | Meier | H01M 8/04089 |
| | | | 251/129.01 |
| 2017/0361286 A1* | 12/2017 | Kremer | F01K 19/08 |
| 2020/0309157 A1* | 10/2020 | Young | D04H 1/26 |

FOREIGN PATENT DOCUMENTS

| | | |
|---|---|---|
| CN | 101905201 U | 12/2010 |
| CN | 202028488 A | 11/2011 |
| CN | 102269292 A | 12/2011 |
| CN | 102820477 A | 12/2012 |
| CN | 103322217 A | 9/2013 |
| DE | 102006044364 | 4/2007 |
| DE | 102010043618 | 5/2012 |
| DE | 102010043636 | 5/2012 |
| DE | 102015226350 | 6/2017 |
| JP | 2005233025 A | 9/2005 |
| JP | 2006153218 A | 6/2006 |
| JP | 2007303638 A | 11/2007 |
| JP | 2012102875 A | 5/2012 |

* cited by examiner

METERING VALVE AND JET PUMP UNIT FOR CONTROLLING A GASEOUS MEDIUM

The invention relates to a metering valve and a jet pump unit for controlling a gaseous medium, in particular hydrogen, for example for use in vehicles having a fuel cell drive.

PRIOR ART

DE 10 2010 043 618 A1 describes a metering valve for controlling a gaseous medium, in particular hydrogen, wherein the metering valve comprises a valve housing, an ejector unit, an actuator and a closure element. In the valve housing there is formed a through-opening which can be freed or closed by the closure element on a valve seat. The ejector unit comprises a feed region, to which a first gaseous medium is fed under pressure, a suction region at which a second medium is present, and a mixing tube region from which a mixture of the first and the second gaseous medium exits. The through-opening is arranged between the feed region and the suction region of the ejector unit.

Metering valves are distinguished by the fact that, upon use thereof, only small pressure fluctuations occur in the anode path of a fuel cell and a smooth operation can be ensured. Frequent opening and closing operations occur in the normal operating range of the metering valve. Additional switching operations may also be desired for optimization of flushing operations in the anode path of the fuel cell or for optimized operation of a jet pump in a fuel cell arrangement. However, frequent opening and closing of the metering valve leads to wear on the valve seat and thus to impairment of the sealing tightness at the valve seat, in particular in the case of an arrangement as is shown in DE 10 2010 043 618 A1.

Wear reduction and thus an optimal mode of operation of the metering valve and of the jet pump in the fuel cell arrangement can be achieved by an improved design of the combination of metering valve and jet pump.

ADVANTAGES OF THE INVENTION

Against this background, the metering valve and jet pump unit according to the invention for controlling a gaseous medium, in particular hydrogen, has the advantage that optimized integration of a metering valve into a jet pump unit improves the tolerances at the valve seat and thus increases the sealing tightness at the valve seat.

For this purpose, the metering valve for controlling a gaseous medium, in particular hydrogen, has a valve housing in which an interior space is formed. In the interior space there is arranged a closure element movable in a reciprocating manner that interacts with a valve seat for opening or closing at least one first through-passage. Moreover, the metering valve has a nozzle in which the at least one through-passage is formed, wherein this through-passage has a circular cylindrical portion.

Furthermore, a jet pump unit comprises the metering valve according to the invention, a jet pump housing, a mixing tube region and a suction region. The jet pump housing comprises the valve housing of the metering valve and a pump housing. A feed passage of the metering valve is preferably formed in the pump housing. The through-bore is conical at least in certain portions, and the nozzle and the valve seat are received in the through-bore.

The integration of the nozzle into the metering valve makes it possible for the flow of the gaseous medium downstream of the valve seat to be guided directly into the jet pump unit. This allows an optimized design of metering valve and jet pump unit to be achieved. Furthermore, pressure losses which occur if the flow of the gaseous medium has to cover a longer distance, for example via a tube, between the metering valve and the jet pump unit are minimized. Furthermore, possible tolerances at the valve seat, in particular the sealing tightness at the valve seat, can be improved by integrating the nozzle into the metering valve, and the direct formation of the valve seat on the nozzle can be realized. The integration of the metering valve according to the invention into the jet pump unit proves to be not only structurally advantageous but also contributes to its optimal functioning. The nozzle is arranged in the through-bore of the jet pump unit in such a way that, around said nozzle, there occurs an optimal flow of gaseous medium from the suction passage and the gaseous medium from the metering valve.

In a first advantageous development, the nozzle adjoins the valve housing and is fixedly connected thereto. The nozzle is advantageously received in the valve housing. As a result, the nozzle can be arranged in the metering valve in a structurally simple manner.

In a further embodiment of the invention, there is advantageously provision that the nozzle has a longitudinal axis, and the through-passage is formed as a central bore in the nozzle. This ensures an optimal flow of the gaseous medium from the metering valve into the through-bore of the jet pump unit.

In an advantageous development, the nozzle comprises a collar and a spigot. The spigot is advantageously conical here. The collar allows an optimal fixed integration of the nozzle into the metering valve in a simple structural manner, with the nozzle being optimally inserted into the jet pump unit by way of the spigot. The conical design of the spigot allows an optimal flow of the gaseous medium in the through-bore of the jet pump unit.

In a further embodiment of the invention, there is advantageously provision that the height of the at least one through-passage is less than 100 mm, preferably less than 30 mm. The distance between the valve seat and an outlet opening of the nozzle should be designed to be as short as possible in order to minimize the pressure loss occurring in the through-passage.

In a further advantageous embodiment, there is provision that the circular cylindrical portion of the at least one through-passage is adjoined by a conical portion. The nozzle advantageously has a diameter d at an inlet-side end of the nozzle and a further diameter D at the outlet opening, where D is greater than d. Consequently, the nozzle has a diffuser region at the outlet opening, thereby resulting in an optimal introduction of the gaseous medium from the through-passage into the through-bore of the jet pump unit.

In a further embodiment of the invention, there is advantageously provision that the valve seat is formed at the inlet-side end of the nozzle. The nozzle advantageously has a sealing edge, at which sealing edge the valve seat is formed as a flat seat. This allows the integration of the nozzle into the metering valve to be realized in a simple structural manner, with at the same time the sealing tightness and functioning of the valve seat being ensured.

In a further embodiment of the invention, an elastic sealing element is arranged between the valve seat and the closure element. As a result, a high degree of sealing tightness of the metering valve can be ensured.

The metering valve described is preferably suitable in a fuel cell arrangement for controlling a hydrogen feed to an anode region of a fuel cell. Advantages are the small pressure fluctuations in the anode path and a smooth operation.

DRAWINGS

Figure 2:
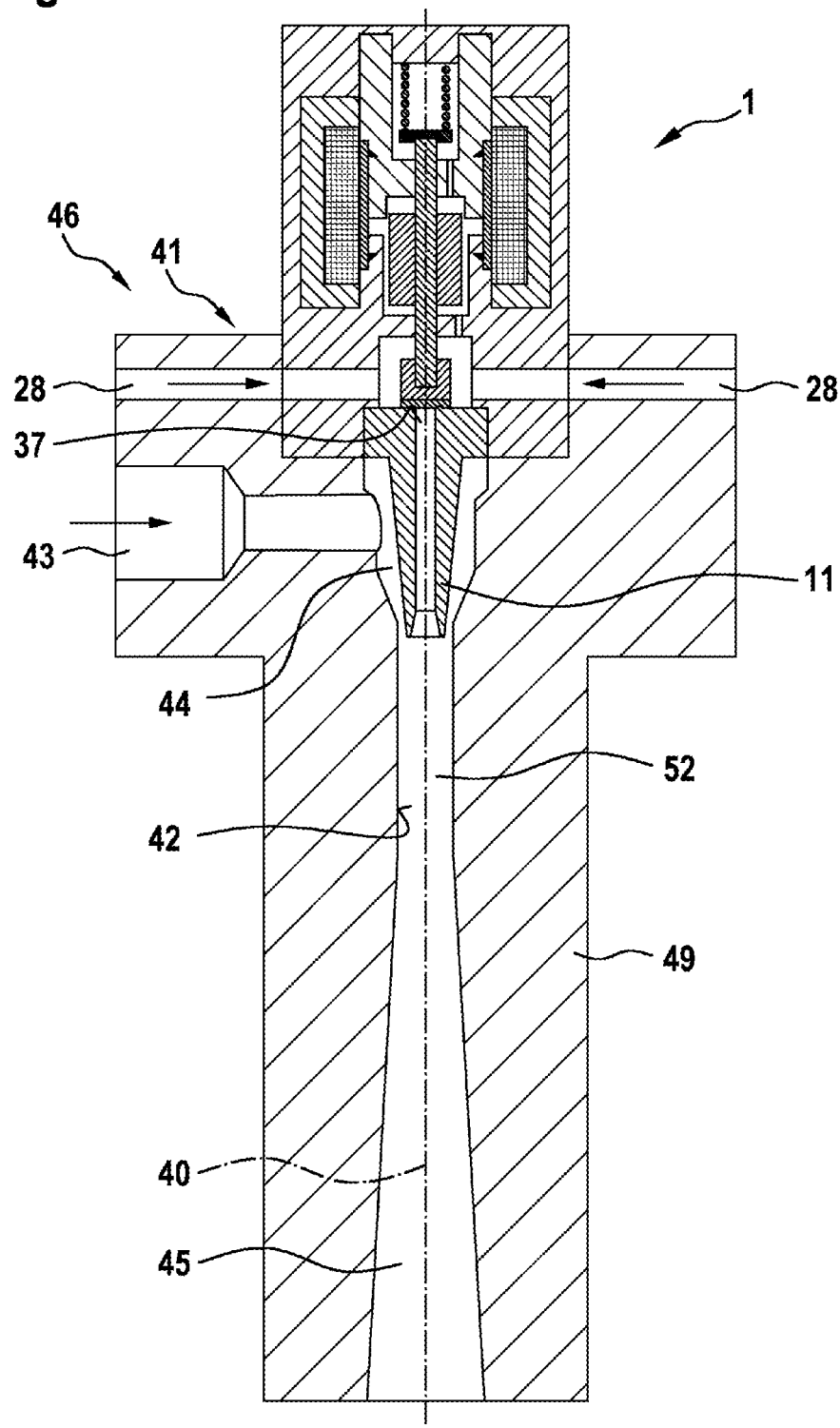

Exemplary embodiments of a metering valve and jet pump unit according to the invention for controlling a gas feed, in particular hydrogen, to a fuel cell are illustrated in the drawing, in which FIG. 1 shows an exemplary embodiment of a metering valve according to the invention with a nozzle, in longitudinal section, and FIG. 2 shows an exemplary embodiment of a jet pump unit according to the invention with the metering valve shown in FIG. 1, in longitudinal section.

Components with the same function have been designated with the same reference number.

DESCRIPTION OF THE EXEMPLARY EMBODIMENTS

FIG. 1 shows an exemplary embodiment of a metering valve 1 according to the invention, in longitudinal section. The metering valve 1 has a valve housing 2 with an interior space 3. An electromagnet 39 is arranged in the interior space 3, the electromagnet 39 comprising a magnet coil 16, an inner pole 12 and an outer pole 14. Furthermore, a magnet armature device 38 movable in a reciprocating manner is arranged in the interior space 3. The magnet armature device 38 comprises a magnet armature 6 and a connecting element 8, the connecting element 8 being received in an aperture 29 of the magnet armature 6 and thus being fixedly connected to the magnet armature 6, for example by a weld seam or by pressing. The magnet armature 6 takes the form of a plunger-type armature and is received in the inner pole 12. The connecting element 8 is received and guided in an aperture of the inner pole 12 at a first guide portion 31 and in an aperture of the valve housing 2 at a second guide portion 33.

A nozzle 11 is arranged on the valve housing 2. The nozzle 11 comprises a collar 47 and a spigot 48. The collar 47 of the nozzle 11 is fixedly connected to the valve housing 2, for example by pressing. The spigot 48 of the nozzle 11 is conical, with the spigot 48 widening in the direction of the collar 47.

The nozzle 11 has a longitudinal axis 40, the latter being identical to the longitudinal axis of the metering valve 1. Here, a through-passage 25 is formed as a central bore in the nozzle 11. The through-passage 25 in the nozzle 11 has a circular cylindrical portion 50 which is adjoined by a conical portion 51. The through-passage 25 has a height h which is less than 100 mm, preferably less than 30 mm. At an inlet-side end 13 of the nozzle 11, the nozzle 11 has a diameter d in the circular cylindrical portion 50. At an outlet opening 18 of the nozzle 11, the latter has a further diameter D, where D is greater than d. The nozzle 11 has a diffuser at the outlet opening 18.

The valve housing 2 and the inner pole 12 delimit a spring space 34 which forms a part of the interior space 3. In this spring space 34 there is arranged a closure spring 24 which is supported between the valve housing 2 and a disk-shaped end 19 of the connecting element 8. The closure spring 24 applies a force to the magnet armature device 38 in the direction of the nozzle 11. The interior space 3 further comprises a magnet armature space 36 which is delimited by the valve housing 2, the inner pole 12 and a sleeve element 20. The sleeve element 20 is fixedly connected to the inner pole 12 and the valve housing 2 by a weld seam 7, with the result that the sleeve element 20 serves as a spacer and seals the magnet armature space 36 with respect to the magnet coil 16, with the result that no gaseous medium, here hydrogen, can pass to the magnet coil 16.

A closure element 10 is arranged at the end opposite to the disk-shaped end 19 of the connecting element 8. This closure element 10 is fixedly connected to the connecting element 8, for example by a weld seam or by pressing. Furthermore, an elastic sealing element 9, which is disk-shaped, adjoins the closure element 10 and is fixedly connected thereto.

A valve seat 37 is formed as a flat seat at the inlet-side end 13 of the nozzle 11. The valve seat 37 is here formed at a sealing edge 15 of the nozzle 11. The valve seat 37 interacts with the closure element 10 and the elastic sealing element 9 for opening or closing the through-passage 25. In the closed position of the metering valve 1, as shown in FIG. 1, the elastic sealing element 9 bears against the sealing edge 15 of the nozzle 11 and thus against the valve seat 37.

The magnet armature 6 is arranged in the magnet armature space 36. The spring space 34 and the magnet armature space 36 are fluidically connected to one another by a first connecting passage 32.

The interior space 3 further comprises a control space 27 in which the closure element 10 with the elastic sealing element 9 is arranged. The control space 27 is connected to the magnet armature space 36 via a second connecting passage 30. Two feed passages 28 are formed in the valve housing 2 perpendicular to the longitudinal axis 40 of the metering valve 1, with the result that the interior space 3 can be filled with gaseous medium, for example hydrogen. These feed passages 28 open into the control space 27.

Mode of Operation of the Metering Valve 1

With the magnet coil 16 not energized, the closure element 10 is pressed against the valve seat 37 via the closure spring 24, with the result that the connection between the control space 27 and the through-passage 25 is interrupted and no throughflow of gas occurs.

If the magnet coil 16 is energized, there is generated on the magnet armature 6 a magnetic force which is directed opposite to the closing force of the closure spring 24. This magnetic force is transmitted to the closure element 10 via the connecting element 8 such that the closing force of the closure spring 24 is overcompensated and the closure element 30 lifts from the valve seat 37. A throughflow of gas from the control space 27 into the through-passage 25 is enabled. Since the metering valve 1 here takes the form of a proportional valve, the lift of the closure element 10 can be adjusted via the level of the current intensity at the magnet coil 16. The higher the current intensity at the magnet coil 16, the greater the lift of the closure element 10 and the higher also the throughflow of gas in the metering valve 1, since the force of the closure spring 24 is lift-dependent. If the current intensity at the magnet coil 16 is reduced, the lift of the closure element 10 is also reduced and thus the throughflow of gas is throttled.

If the current at the magnet coil 16 is interrupted, the magnetic force on the magnet armature 6 is reduced, with the result that the force on the closure element 10 by means of the connecting element 8 is reduced. The closure element 10 moves in the direction of the through-passage 25 and seals against the valve seat 37 by way of the elastic sealing element 9. The throughflow of gas in the metering valve 1 is interrupted.

The metering valve 1 according to the invention can be used, for example, in a fuel cell arrangement. Hydrogen from a tank can be fed to an anode region of the fuel cell by means of the metering valve 1. Depending on the level of the current intensity at the magnet coil 16 of the metering valve 1 by which the lift of the closure element 10 is actuated, a flow cross section is varied at the through-passage 25 in such a way that there continuously occurs a requirement-appropriate adjustment of the gas flow fed to the fuel cell.

The metering valve 1 for controlling a gaseous medium thus has the advantage that the feeding of the first gaseous medium and the metering of hydrogen into the anode region of the fuel cell can here occur in a substantially more exact manner by means of electronically controlled adaptation of the flow cross section of the through-passage 25 with simultaneous control of the anode pressure. As a result, the operational reliability and durability of the connected fuel cell are considerably improved, since hydrogen is always fed in a superstoichiometric fraction. In addition, secondary damage, such as damage to a downstream catalyst, for example, can also be prevented.

FIG. 2 shows a jet pump unit 46 with the metering valve 1 according to the invention, in longitudinal section. The jet pump unit 46 has a jet pump housing 41 which comprises the valve housing 2 of the metering valve 1 and a pump housing 49.

A through-bore 42, a suction passage 43 and the feed passage 28 of the metering valve 1 are formed in the pump housing 49. A suction region 44 and a mixing tube region 52 are formed in the through-bore 42. The metering valve 1 is partially received in the through-bore 42 coaxially to the longitudinal axis 40, which also corresponds to the longitudinal axis of the jet pump unit 46. The nozzle 11 and the valve seat 37 are arranged in the through-bore 42. The nozzle 11 is arranged in such a way that it is arranged axially upstream of the mixing tube region 52. Furthermore, the nozzle 11 closes off the suction region 44 from the mixing tube region 52.

The through-bore 42 is conical at least in certain portions, with the result that a greater throughflow cross section of the gaseous medium flows through the through-bore 42 at a discharge region 45.

The through-bore 42 is here formed axially to the longitudinal axis 40. It is also possible for example for the through-bore 42 to be formed radially to the longitudinal axis 40.

Mode of Operation of the Jet Pump Unit 46

With the valve seat 37 of the metering valve 1 opened or partially opened, gaseous medium flows out of the tank from the feed passage 28 of the metering valve 1 via the valve seat 37 into the through-passage 25 in the nozzle 11. After exiting the nozzle 11 and entering the through-bore 42 in the suction region 44, this hydrogen impinges on gaseous medium, likewise hydrogen, which has already been fed to the fuel cell, but not used, and has been guided back into the jet pump unit 46 via the suction passage 43. In the mixing tube region 52, as a result of momentum exchange of the gaseous media, a mass flow is sucked out of the suction region 44 and delivered in the direction of the discharge region 46 and thus in the direction of the anode region of the fuel cell. Depending on the geometry of the through-bore 42 and the angle of insertion of the metering valve 1 and thus of the nozzle 11, there can occur a requirement-appropriate adjustment of the gas flow fed to the fuel cell.

The invention claimed is:

1. A metering valve (1) for controlling a gaseous medium, having a valve housing (2), wherein an interior space (3) is formed in the valve housing (2), and having a closure element (10) that is movable in a reciprocating manner and that is arranged in said interior space and interacts with a valve seat (37) for opening or closing at least one first through-passage (25), characterized in that the metering valve (1) has a nozzle (11), wherein the at least one through-passage (25) is formed in the nozzle (11), and the at least one through-passage (25) has a circular cylindrical portion (50), wherein the nozzle (11) has a diameter d at an inlet-side end (13) of the nozzle (11) and a further diameter D at an outlet opening (18), where D is greater than d, wherein a portion of the nozzle (11) having the further diameter (D) is disposed outside of the valve housing (2), wherein the circular cylindrical portion (50) of the at least one through-passage (25) is adjoined by a conical portion (51), wherein the circular cylindrical portion (50) extends from the inlet-side end (13) and the conical portion (51) extends from the circular cylindrical portion (50) to the outlet opening (18), wherein the circular cylindrical portion has the diameter d, and wherein the conical portion (51) has the diameter d at an end adjacent to the circular cylindrical portion and has the further diameter D at the outlet opening (18).

2. The metering valve (1) for controlling a gaseous medium as claimed in claim 1, characterized in that the nozzle (11) adjoins the valve housing (2) and is fixedly connected thereto.

3. The metering valve (1) for controlling a gaseous medium as claimed in claim 1, characterized in that the nozzle (11) is received in the valve housing (2).

4. The metering valve (1) for controlling a gaseous medium as claimed in claim 1, characterized in that the nozzle (11) has a longitudinal axis (40), and the through-passage (25) is formed as a central bore in the nozzle (11).

5. The metering valve (1) for controlling a gaseous medium as claimed in claim 1, characterized in that the nozzle (11) comprises a collar (47) and a spigot (48), wherein the spigot (48) is conical.

6. The metering valve (1) for controlling a gaseous medium as claimed in claim 1, characterized in that a height h of the at least one through-passage (25) is less than 100 mm.

7. The metering valve (1) for controlling a gaseous medium as claimed in claim 1, characterized in that the valve seat (37) is formed at the inlet-side end (13) of the nozzle (11).

8. The metering valve (1) for controlling a gaseous medium as claimed in claim 1, characterized in that the nozzle (11) has a sealing edge (15), at which the valve seat (37) is formed as a flat seat.

9. The metering valve (1) for controlling a gaseous medium as claimed in claim 1, characterized in that an elastic sealing element (9) is arranged between the valve seat (37) and the closure element (10).

10. A jet pump unit (46), comprising a metering valve (1) as claimed in claim 1; a jet pump housing (41), wherein the jet pump housing (41) comprises the valve housing (2) of the metering valve (1) and a pump housing (49); a mixing tube region (52) and a suction region (44).

11. The jet pump unit (46) as claimed in claim 10, characterized in that a feed passage (28) of the metering valve (1) is formed in the pump housing (49).

12. The jet pump unit (46) as claimed in claim 11, characterized in that a through-bore (42) is conical at least in certain portions, and the nozzle (11) and the valve seat (37) are received in the through-bore (42).

13. A fuel cell arrangement having a jet pump unit (46) as claimed in claim 1, the jet pump unit being configured for controlling a hydrogen feed to a fuel cell.

14. The metering valve (1) for controlling a gaseous medium as claimed in claim 1, characterized in that a height h of the at least one through-passage (25) is less than 30 mm.

15. The metering valve (1) for controlling a gaseous medium as claimed in claim 1, wherein the nozzle (11) includes a spigot (48), wherein the spigot (48) is conical over an entire length of the spigot (48), wherein the further diameter (D) is disposed within the spigot (48).

16. The metering valve (1) for controlling a gaseous medium as claimed in claim 15, wherein an outer diameter of the spigot (48) decreases towards the outlet opening (18) along a longitudinal axis defined by the spigot (48).

17. The metering valve (1) for controlling a gaseous medium as claimed in claim 16, wherein the nozzle (11) includes a collar (47) disposed within the valve housing (2), wherein the spigot (48) extends from the collar (47).

18. A jet pump comprising:
a metering valve (1) for controlling a gaseous medium, having a valve housing (2), wherein an interior space (3) is formed in the valve housing (2), and having a closure element (10) that is movable in a reciprocating manner and that is arranged in said interior space and interacts with a valve seat (37) for opening or closing at least one first through-passage (25), characterized in that the metering valve (1) has a nozzle (11), wherein the at least one through-passage (25) is formed in the nozzle (11), and the at least one through-passage (25) has a circular cylindrical portion (50), wherein the nozzle (11) has a diameter d at an inlet-side end (13) of the nozzle (11) and a further diameter D at an outlet opening (18), where D is greater than d, wherein a portion of the nozzle (11) having the further diameter (D) is disposed outside of the valve housing (2);
a jet pump housing (41), wherein the jet pump housing (41) includes the valve housing (2) of the metering valve (1) and a pump housing (49);
a mixing tube region (52), and a suction region (44);
wherein a feed passage (28) of the metering valve (1) is formed in the pump housing (49), a through-bore (42) is conical at least in certain portions, and the nozzle (11) and the valve seat (37) are received in the through-bore (42).

\* \* \* \* \*